J. KEMP.
ANIMAL TRAP.
APPLICATION FILED FEB. 1, 1911.
1,011,207.
Patented Dec. 12, 1911.
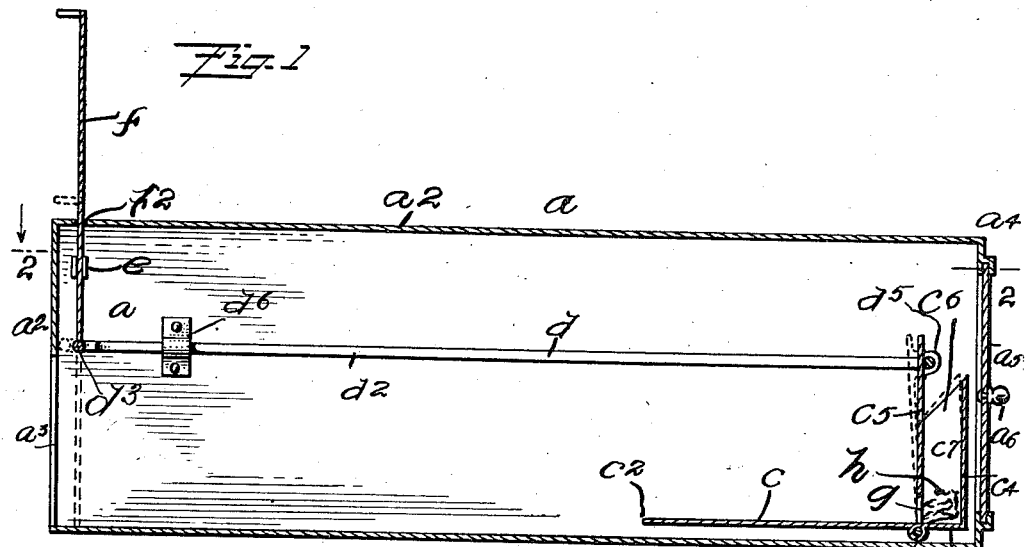
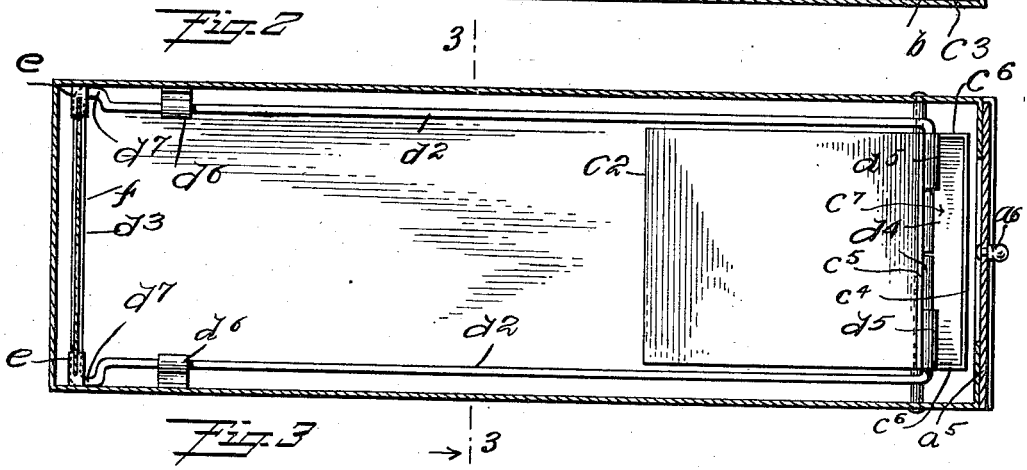
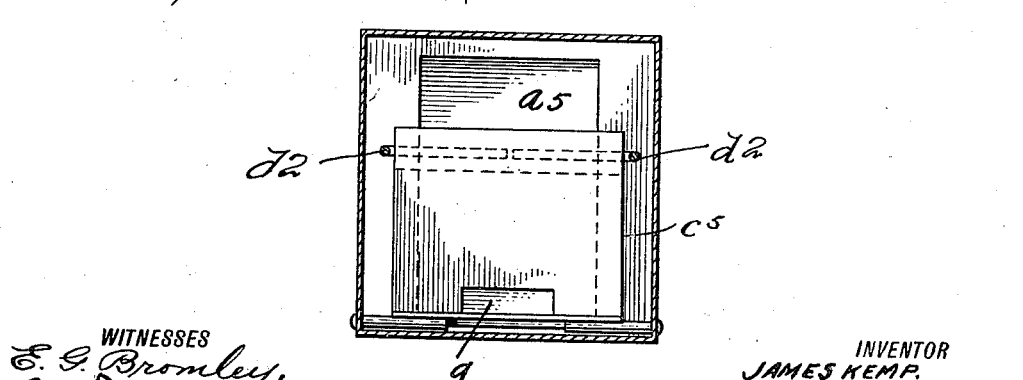
WITNESSES
E. G. Bromley,
C. E. Aubrey
INVENTOR
JAMES KEMP.
BY Edgar Tate & Co.
ATTORNEYS.

UNITED STATES PATENT OFFICE.

JAMES KEMP, OF DELHI, NEW YORK.

ANIMAL-TRAP.

1,011,207. Specification of Letters Patent. Patented Dec. 12, 1911.

Application filed February 1, 1911. Serial No. 605,867.

*To all whom it may concern:*

Be it known that I, JAMES KEMP, a citizen of the United States, and residing at Delhi, in the county of Delaware and State of New York, have invented certain new and useful Improvements in Animal-Traps, of which the following is a specification, such as will enable those skilled in the art to which it appertains to make and use the same.

This invention relates to animal traps, and the object thereof is to provide an improved device of this class designed particularly for use in catching mice, rats and other small animals of this class but which may also be used for catching larger animals, if desired; and with this and other objects in view the invention consists in a device of this class specified, constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a central longitudinal vertical section of my improved trap; Fig. 2 a horizontal section thereof on the line 2—2 of Fig. 1; and, Fig. 3 a transverse section on the line 3—3 of Fig. 2.

In the practice of my invention, I provide an oblong rectangular box $a$, the front end $a^2$ of which is provided in the bottom portion thereof with a door $a^3$ and the rear end portion $a^4$ of which is provided with a transversely slidable and removable door $a^5$ having a central knob or handle $a^6$ by which it may be manipulated, but the door $a^5$ need not necessarily be a sliding door.

Inwardly of the rear end portion of the box $a$ and ranging transversely thereof near the bottom thereof is a rod $b$ on which is mounted a rock plate $c$, the front end portion of which extends forwardly to a predetermined point at $c^2$, and the rear end portion of which extends backwardly to form a backwardly directed extension $c^3$ having an upwardly directed member $c^4$ forming in connection with a vertical plate $c^5$ rigidly connected with the plate $c$ and side walls $c^6$, a chamber $c^7$ which is open at the top and which is about half the height of the door $a^5$, in the form of construction shown, and the parts $c^4$ and $c^6$, forming the chamber $c^7$, are rigidly connected with the plate $c$ and move or rock therewith. I also provide a yoke-shaped device $d$ consisting of parallel side rods $d^2$ provided at the front ends thereof with a cross head member $d^3$ and the rear end portions of which are bent inwardly at right angles, as shown at $d^4$, and passed through keepers $d^5$ secured transversely of the top portion of the plate $c^5$, and the parallel members $d^2$ of the yoke-shaped device $d$ are passed through keepers $d^6$ secured to the sides of the box $a$.

The parallel side members $d^2$ of the yoke-shaped device $d$ are provided, in the form of construction shown, and adjacent to the cross head member $d^3$ of said yoke-shaped device with outwardly directed loops $d^7$, and secured to the opposite sides of the box $a$ directly over the cross head portion $d^3$ of the yoke-shaped device $d$, when said yoke-shaped device is in the position shown in full lines in Figs. 1 and 2, are keepers $e$ in which is mounted a vertically movable plate $f$ which passes through a corresponding slot or opening $f^2$ in the top $a^2$ of the box $a$, and when the parts are in the position shown in Figs. 1 and 2, this plate $f$ rests on the cross head portion $d^3$ of the yoke-shaped device $d$, as clearly shown in said figures.

The bottom portion of the plate $c^5$ is provided with an opening $g$, and in order to set the trap the door $a^5$ is opened and the bait $h$ of any desired material is dropped into the chamber $c^7$, when the rock plate $c$ with its connected parts and the yoke-shaped member $d$ will assume the position shown in Fig. 1. The plate $f$ is then dropped into the position shown in said figure and rests on the cross head portion $d^3$ of the yoke-shaped device $d$. If now, a mouse, rat or other animal enters the trap through the door $a^3$ being attracted by the bait $h$, the said animal will pass through the trap until he reaches the front or end portion of the rock plate $c$ and will step onto said plate, and said plate will drop into the position shown in dotted lines in Fig. 1, and the parts connected therewith will also assume the position shown in dotted lines in said figure, and the vertical movable plate $f$ will drop down into the position shown in dotted lines in said figure and the door $a^3$ will be closed and the animal cannot leave the trap or escape therefrom.

Any suitable means may be provided to hold the plate *f* in its bottom position, if desired, but ordinarily no such means will be necessary.

The box *a* may be made of any preferred material but I prefer that said box with all the parts of the trap as shown and described be made of metal.

My improved trap, as will be understood, may be made of any desired size, and may be used for any of the purposes for which such devices are usually employed.

Having fully described my invention, what I claim as new and desire to secure by Letters Patent, is:—

In a trap of the class described, an oblong box or case provided at one end with a door opening and within said end with a vertically movable door plate, a rock plate pivoted in the bottom of the opposite end portion of said box or case and provided inwardly of its rear end with an upwardly directed member, in the bottom of which is an opening, said rock plate being also provided at its rear end with an upwardly directed part forming, in connection with said member, a bait chamber which is open at the top, and a yoke-shaped device, the side portions of which are pivotally connected with said upwardly directed member and extend parallel with the sides of the box or case approximately to the opposite end thereof, and the cross head portion of which forms a support for said vertically movable door plate when the trap is set.

In testimony that I claim the foregoing as my invention I have signed my name in presence of the subscribing witnesses this 30th day of January 1911.

JAMES KEMP.

Witnesses:
HAMILTON J. HEWITT,
J. CLARENCE CAMERON.

---

Copies of this patent may be obtained for five cents each, by addressing the "Commissioner of Patents, Washington, D. C."